United States Patent [19]

Nordstrom

[11] 3,960,228

[45] June 1, 1976

[54] SHEAR BEAM LOAD CELL

[75] Inventor: Kjell Helge Nordstrom, Vasteras, Sweden

[73] Assignee: Transearch AB, Vasteras, Sweden

[22] Filed: May 31, 1974

[21] Appl. No.: 475,060

[52] U.S. Cl. .............................. 177/211; 177/136; 73/141 A
[51] Int. Cl.² ........................................ G01G 3/14
[58] Field of Search ..................... 73/141 A, 141 R; 177/136–137, 210–211

[56] References Cited
UNITED STATES PATENTS

| | | | |
|---|---|---|---|
| 2,370,784 | 3/1945 | Edwards | 73/141 R |
| 2,499,033 | 2/1950 | Oberholtzer | 177/211 |
| 2,598,812 | 6/1952 | Marco et al. | 73/88.5 R |
| 2,868,535 | 1/1959 | Ruge | 177/211 |
| 3,321,035 | 5/1967 | Tarpley | 177/136 |
| 3,449,949 | 6/1969 | Brody et al. | 73/141 A |
| 3,474,875 | 10/1969 | Laimins | 177/211 |
| 3,620,074 | 11/1971 | Laimins et al. | 73/88.5 R |
| 3,669,756 | 6/1972 | Bradley | 177/136 |
| 3,710,880 | 1/1973 | Arden | 177/137 |
| 3,714,997 | 2/1973 | Ahl et al. | 177/136 |

*Primary Examiner*—L. T. Hix
*Assistant Examiner*—Vit W. Miska

[57] ABSTRACT

A load cell for use with a carrier which receives a load to be weighed. The carrier applies a force to a beam of the load cell along a load-measuring direction and the beam includes electronic transducer means for sensing such force. The beam is provided with a recess which extends in the load-measuring direction. The recess is for receiving a load carrier support means and holds the carrier in place so that the force due to the load is directed in the load-measuring direction.

17 Claims, 8 Drawing Figures

SHEAR BEAM LOAD CELL

BACKGROUND OF THE INVENTION

The present invention relates to a load cell and particularly to a load-sensing system of the type where a load carrier is supported by a load cell for sensing the load on the carrier. Such load cells and load-sensing systems may be used for various purposes, and for exemplary purposes are disclosed herein in a weighing system, such as for the weighing of trucks or railway cars.

Load-sensing systems which are employed in weighing of vehicles, such as trucks and railroad cars, include load cells which measure the load on a load carrier. Such systems may be found in U.S. Pat. Nos. 3,714,997; 3,734,216; 3,734,217; and 3,741,327. These patents disclose systems which eliminate the need for massive foundation supports (which are cumbersome, time-consuming, and expensive to install) by providing vehicle weighing devices which are supported for movement with the rails and which may be easily but, yet, accurately installed in existing railway systems. These systems include a load carrier onto which the vehicle is moved. The load carrier is supported by a plurality of load cells.

One problem that exists in the design of weighing systems is the problem of accuracy. The load must be applied to the load-sensing cell in the proper direction to obtain accurate weighing. For example, in vehicle scales the movement of the vehicle (load being weighed) onto the load carrier tends to cause movement of the load carrier relative to the load-sensing cell, which tendency affects the accuracy of the weighing system. If the load carrier was allowed to move so far that it hit the pit walls the load would be shunted past the load cells, resulting in erroneous readings. The common manner of solving this problem is to use check rods to limit load carrier shifting. U.S. Pat. No. 3,736,998 also solves this problem by using a linkage intermediate the load carrier and a load sensing-cell which provides for proper application of the load to the load cell, even though the load carrier may shift.

In addition, accuracy in such weighing systems is affected by the construction of the load cell or cells used in the system. With respect to shear beam load cells, the position of the strain gauges on the shear beam is critical to accuracy, particularly if the load cell is to accept side loads or twisting moments. Theoretically, if the strain gauges are precisely positioned the affect on one side of the shear beam cancels the affect on the other side of the beam. However, such precise perfect positioning is difficult if not impossible as a practical matter to obtain.

SUMMARY OF THE PRESENT INVENTION

The present invention provides a load cell and a weighing system which are constructed to provide for the proper application of the load to the load cell and to minimize the effect of imperfect positioning of the strain gauges on a shear beam for a shear beam load cell. The load cell of the present invention is usable in any load sensing system. When so used, the load cell is inexpensive, easy to install, and the system does not require check rods, and yet is extremely accurate.

A shear beam load cell embodying the present invention has a recess in the beam which extends in a direction in which the forces of the load carrier and its respective load are applied to the beam. The recess is for receiving a load carrier support means which extends into the recess and supports the load carrier upon the beam and accurately positions and retains the load carrier in a desired location relative to the beam so that the forces of the load are applied in the proper load-measuring direction to the beam, enabling accurate measurements to be made without the use of check rods, or the like. In addition, the effect of side loads and twisting moments are reduced.

DESCRIPTION OF EMBODIMENTS OF THE PRESENT INVENTION

As noted hereinabove, the present invention relates to a load cell and a load-sensing system, preferably a weighing system where the load to be weighed, such as a vehicle, is applied to a load carrier, which in turn is supported by shear beam type of load cell. In accordance with the present invention, the load carrier is supported by the shear beam load cell in such a manner that the load is applied to the load cell in a direction to enable accurate measuring of the load. The construction is such that it is inexpensive, easy to install, and enables extremely accurate weighing of the vehicle to occur.

Figure 1:
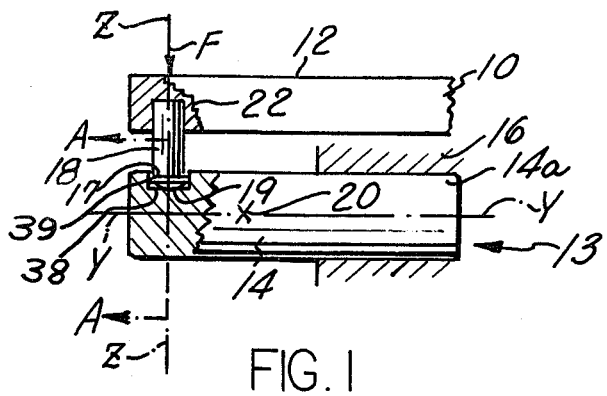
FIG. 1 is a sectional view showing a load-sensing system constructed in accordance with the principles of the present invention.

Referring to the drawings, FIG. 1 illustrates a load-sensing system and a load cell constructed in accordance with the principles of the present invention. As shown in FIG. 1, a load carrier 10 includes a surface 12 upon which the load to be measured is applied. The load may be a railroad car or vehicle, which is to be weighed and which is moved onto the load carrier 10 in a direction perpendicular to the axis of a beam 14. The load carrier 10 may be supported by a plurality of load cells 13 which are designed to provide a measurement of the load on the surface 12. (Only one cell 13 is shown in FIG. 1) The load cell 13 includes the beam 14 which is suitably secured in a mounting means or foundation 16 in such a manner that a portion 14a of the beam is suitably supported for application of a shear force thereto.

In the embodiment shown in FIG. 1, the load carrier 10 is mounted on the beam 14 in such a manner as to apply a force F along the line Z—Z which is perpendicular to the longitudinal neutral axis Y—Y of the beam 14. Such a line will be referred to hereinafter as extending in the load-measuring direction. A strain gauge arrangement 20 is provided on the beam portion 14a to sense the strain caused by the application of the force F applied along the load-measuring direction. Suitable circuitry is provided for determining the magnitude of the said force and therefore the weighing of the load on the load carrier 10.

Figure 6:
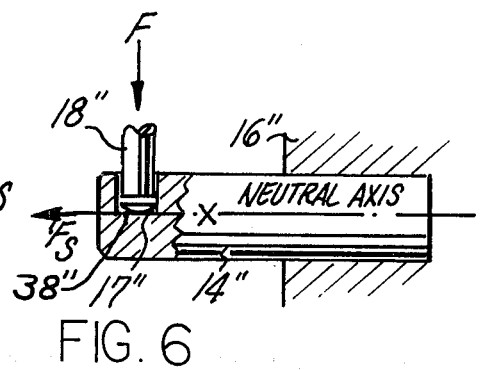
FIG. 6 is a sectional view illustrating how the present invention may be used to minimize the effect of side loading in a load-sensing system in accordance with the present invention.
Figure 7:
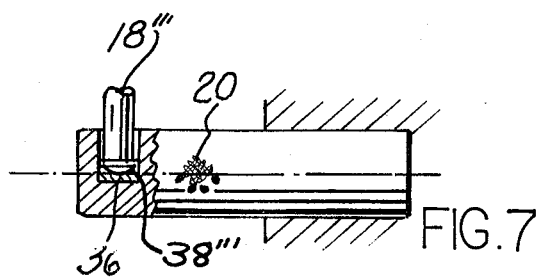
FIG. 7 is a sectional view showing a modified form of the present invention.

The strain gauge arrangement 20 includes strain gauges located on diametrically opposed sides of the beam portion 14a and which are preferably of the double-grid type having a pair of mutually perpendicular grid wires, as shown in FIG. 7. It is desirable that each grid be oriented at 45° to the neutral axis Y—Y of the beam so that if the gauges are centered on the neutral axis no bending or twisting moments due to side loading would be measured as strains. For a further explanation of this theory, reference may be had to U.S. Pat. No. 3,734,216, the disclosure of which is hereby incorporated by reference. In FIGS. 1, 3, 5, 6 and 8, the strain gauges are represented schematically by an X.

In accordance with the present invention, the load carrier 10 is supported by the shear beams 14 in a manner which minimizes the tendency of the load carrier to shift relative to the beams 14 and which minimizes any inaccuracy caused by side loads and twisting moments. This support is provided by a load carrier support means 18. Specifically, the beam portion 14a is provided with a radially oriented recess 17 which, as clearly shown in FIG. 1, extends generally in the load measuring direction along line Z—Z. The end portion of recess 17 defines a load receiving surface 38. The load carrier support means 18 comprises a loading pin which extends into the radially oriented recess 17 in the beam 14 and contacts the load receiving surface. The loading pin 18 is fixed in the load carrier 10 and the load carrier 10 in turn rests thereupon. Also, the end of the loading pin 18 is spherically shaped (FIGS. 1 and 2) and its contact with the load receiving surface 38 approximates a point, as shown at 19. In this manner, the load carrier 10 is suitably held in place by the loading pin 18 and the force due to the load being moved onto the surface 12 of the load carrier 10 will not cause shifting of the load carrier 10 relative to the beam 14, and check rods to accomplish that result are not required. Loading pin 18 preferably includes a flange 39 having a diameter just less than the diameter of recess 17.

Also, any side force or twisting moment applied to the shear beam is applied within the periphery of the shear beam thus minimizing the moment arm through which that force acts and thus minimizes any inaccuracy due to the location of the gauges on the shear beam.

Figure 2:
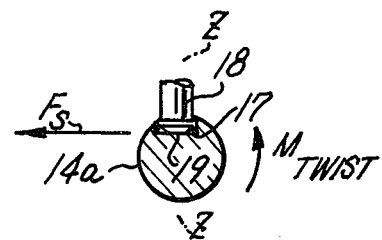
FIG. 2 is a sectional view taken substantially along line A—A of FIG. 1.

Referring to FIGs. 1 and 2, the recess 17 in the beam which receives the loading pin 18 is a radially oriented recess, i.e., it is concentric about the line Z—Z defining the load-measuring direction. This shape, coupled with the outermost dimensions of the sides of the loading pin, which are just slightly less than that of the recess provide a means whereby insertion of the loading pin 18 in the recess enables the load carrier to be easily and accurately positioned in such a manner that the force F of the load carrier will be directed along the load-measuring direction.

Figure 3:
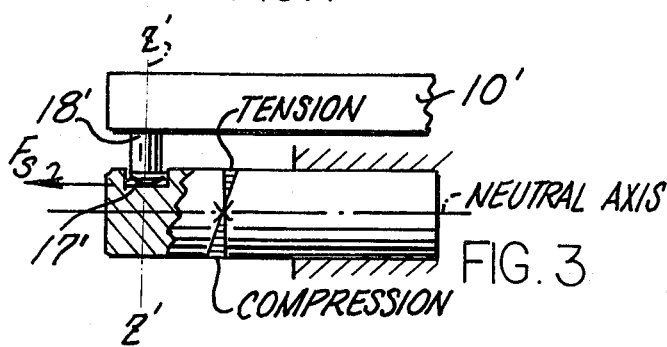
FIG. 3 is a sectional view showing a modified form of the load-sensing system in accordance with the present invention.

In FIG. 3, there is shown a similar form of the present invention in which the loading pin 18' is integral with the load carrier 10'. In this arrangement, positioning of the load carrier on the beam may be simply accomplished by positioning of the loading pin 18' in the radially oriented recess 17'.

Figure 4:
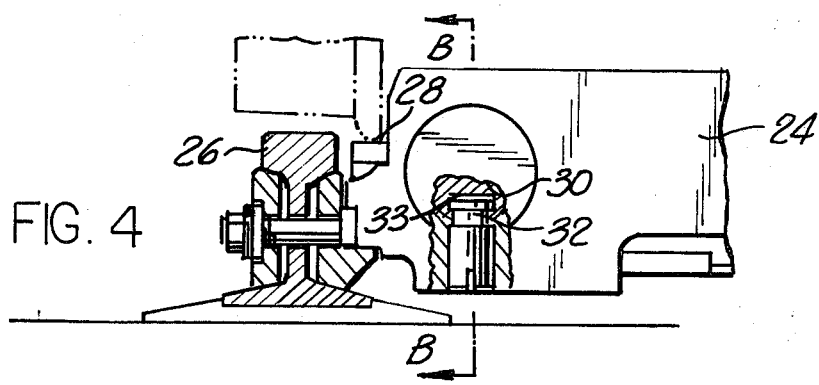
FIG. 4 is a sectional view showing another form of the present invention, and illustrating the use of the load sensing system in accordance with the present invention in a vehicle weighing system.
Figure 5:
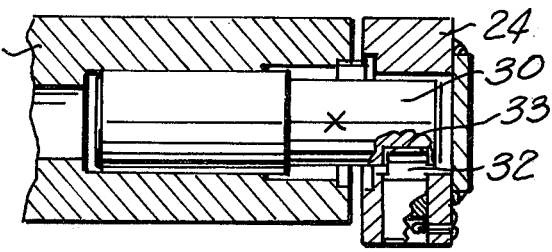
FIG. 5 is a sectional view taken substantially along the line B—B of FIG. 4.

FIGs. 4 and 5 disclose a modified form of the present invention which is particularly useful in weighing systems for weighing railroad cars. In this embodiment of the invention, a frame 24 extends transversely of the rails 26 and is suitably supported thereupon. The load carrier will generally comprise a pair of vehicle-supporting platform members 28 (only one is shown in FIGS. 4 and 5) which are suitably connected together. In this embodiment of the invention, the shear beam load cell 30 is connected to the load carrier 28 and the loading pin 32 is suitably anchored on the frame 24. With the beam and the load carrier thus connected together, location of the radially oriented recess 33 carried by the beam on the loading pin 32 facilitates accurate positioning of the shear beam load cell for application of the force to be measured along the load-measuring direction.

Referring now to FIg. 6, further advantages of the present invention will be evident. As noted above, it is known that where strain gauges are used to sense the shear force resulting from application of a load to a beam, if the strain gauges are precisely centered on the inflection points along the longitudinal axis of the beam, the measuring accuracy of the system is good. However, if the strain gauges are not accurately positioned, and in practice it has been found to be very difficult to achieve precise positioning of such strain gauges, these strain gauges tend to sense the bending moments introduced by side loads above or below the neutral axis of the beam. FIGS. 3 and 6 show the direction of the side forces $F_s$ which would generate strains which would be sensed by the strain gauges. The recess construction, as discussed, minimizes the inaccuracy due to inaccurate location of the gauges by minimizing the moment arm through which side forces act. Similarly, a transverse side load above or below the neutral axis would introduce a twisting moment which is directly sensed by the gauges as a shear force. Since the gauges on one side of the beam sense a positive strain and the gauges on the other side sense a negative strain from the twisting they should, in theory, cancel each other. However, because of the difficulty in precisely positioning the gauges, the effects of such strains do not generally cancel each other completely. Thus twisting moments also tend to introduce error signals into a load weighing system. The direction of side loading forces $F_s$ which would introduce such twisting moments into the system is shown in FIG. 2.

Figure 8:
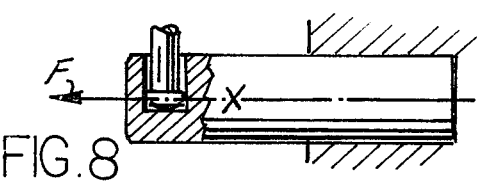
FIG. 8 is a sectional view showing another manner in which the present invention may be used to minimize side loading.

In the embodiment of FIG. 6, it is shown how the present invention may be easily used to drastically reduce the possibility of side loads introducing any extraneous bending moments or twisting moments into the system. In the embodiment of FIG. 6, the recess 17'' is extended so that its load receiving surface 38'' extends to the neutral axis and the loading pin 18'' is of a length to contract the lower portion of the recess, whereby any side forces will be directed substantially along the neutral axis. In this manner, the undesirable effect of side forces will be substantially eliminated, and, of course, the measuring accuracy of the system will be highly reliable. It should be noted that, while the depth of the recess 17'' has been shown in FIG. 6 surface 38″ extending to the neutral axis, the optimum depth for such a recess might be such that the load receiving surface is slightly below the neutral axis (as shown in FIG. 8), since the side loads are transferred from the pin to the recess both at the point of the pin and at the side of it.

Referring to FIG. 7, there is shown an additional modified form of the present invention. In FIG. 7, a hardened plug 36 is inserted into the hole adjacent the load receiving surface 38′″ and the loading pin 18′″ rests thereupon. With the plug 36 chosen of a material hard enough to withstand the high unit load from the loading pin, the beam itself can be manufactured of a considerably softer material than it would otherwise have to be made of.

It should be readily obvious that, while the load cell and load-sensing systems shown in FIGs. 1 through 8 only show a single loading pin and a single beam supporting the load carrier, in practice the load carrier may, of course, be supported by a plurality of loading pins and shear beams.

Also, it should be clear that the load cell and the load-sensing systems as described heretofore are capable of various modifications without departing from the spirit of the present invention. For example, with a system of the type disclosed by FIG. 1, while it is preferred that the loading pin be fixed to the load carrier it is also contemplated that the connection between the two might be such as to limit motion transverse to the load measuring direction while permitting the load carrier and its recess to be moveable relative to the pin in the load measuring direction so as to be insertable thereover. Also, the load carrier may simply rest upon the loading pin, in which case, the combined load cell and loading pin may be used as a conventional load cell.

A load cell and a loading system in accordance with the foregoing description has been found to be relatively inexpensive, easy to install, and has been found to yield highly accurate measurements when used in a vehicle weighing system.

Having described the invention, what is claimed is:

1. Apparatus comprising a carrier for receiving a load thereon, a load cell operative to sense forces applied thereto in a load-measuring direction, said load cell comprising a beam and shear-sensing transducer means carried by said beam, means for retaining said carrier in place relative to said load-sensing means and for applying at least a portion of a load supported by the carrier to said load cell in said load-measuring direction upon positioning of the load on said carrier, said last mentioned means comprising a carrier support member connected to said carrier and adapted to limit relative movement therebetween in directions transverse to said load measuring direction, means defining a radially oriented recess in said beam, said radially oriented recess including an inward end surface defining a load receiving surface, said carrier support member extending into said radially oriented recess and being effective to transmit a force proportional to at least a portion of said load to said load receiving surface in the load measuring direction, said radially oriented recess defining means for resisting relative movement of said carrier support member in directions transverse to said load measuring direction.

2. Apparatus as set forth in claim 1 wherein said carrier support member includes a loading pin integral with said carrier, said loading pin extending into the radially oriented recess in said beam.

3. Apparatus as set forth in claim 1 wherein said load receiving surface is at or close to the longitudinal neutral axis of said beam.

4. Apparatus as set forth by claim 1 wherein said carrier support member extends outside the radially oriented recess and the carrier is adapted to rest on a portion of said carrier support member.

5. Apparatus as set forth in claim 1 wherein said carrier is supported by a plurality of carrier support members, further including a plurality of load cells each operative to sense forces applied thereto in a load measuring direction, each load cell comprising a beam and shear sensing transducer means carried by the beam, each beam including a radially oriented recess for receiving a respective one of said carrier support members and for resisting movement of the carrier support member in directions transverse to the load measuring direction of its respective beam.

6. Apparatus as set forth in claim 1 further including a plug member between said carrier support member and said load receiving surface, so that the carrier support member transmits force to the load receiving surface through the plug member.

7. Apparatus as set forth in claim 1 wherein said carrier support member comprises an elongated member having an end portion which extends into said radially oriented recess, said end portion terminating in a generally spherically shaped end surface which engages said load receiving surface.

8. Apparatus as set forth in claim 4 wherein said carrier includes means defining a recess for receiving a portion of the carrier support member which extends outside the radially oriented recess.

9. Apparatus as set forth in claim 6 wherein said plug member is formed of a harder material than said beam.

10. Apparatus as set forth in claim 7 wherein said elongated member comprises a cylindrical shaft having a first diameter, said elongated member further including a cylindrical flange having a second diameter which is greater than said first diameter, said radially oriented recess being cylindrically shaped with a diameter which is slightly greater than the diameter of said second diameter whereby engagement of said flange with the wall of said radially oriented recess substantially limits movement of said loading pin in directions transverse to said load measuring direction.

11. Apparatus comprising a carrier for supporting the wheels of a vehicle, means for supporting said carrier at a portion of the surface along which the vehicle runs with the carrier adapted to support the wheels of a vehicle as the vehicle traverses the portion of the surface at which said carrier is located and for sensing the forces applied to the carrier by the vehicle comprising a plurality of load cells, each of which is operative to sense forces applied thereto in a load measuring direction each of said load cells including a beam and shear-sensing transducer means carried by the beam, a plurality of support members each of which is associated with a respective beam, each of said beams including a radially oriented recess having an inward end surface defining a load receiving surface, each support member being received in a respective radially oriented recess with a portion of the support member adapted to transmit force to the load receiving surface in the load measuring direction, each radially oriented recess defining means for limiting relative movement between the support member and the load cell in directions transverse to said load measuring direction.

12. Apparatus as set forth in claim 11 wherein said surface is a railway track and each of said support members is supported by a portion of the railway track, and wherein each of the beams are fixedly secured to the carrier.

13. Apparatus for use with a carrier which receives a load thereon and which transmits at least a portion of the load received thereon to a carrier support member, said apparatus comprising a load cell operative to sense forces applied thereto in a load measuring direction, said load cell comprising an elongated axially extending beam having an axially extending neutral axis, said load measuring direction extending generally perpendicular to said neutral axis, said beam including means for receiving the carrier support member for directing the portion of the load transmitted to the carrier support member to the beam in the load measuring direction and for resisting movement of the carrier support member in directions transverse to the load measuring direction comprising means defining a radially oriented recess in said beam having wall means for resisting movement of the carrier support member in directions transverse to the load measuring direction, said radially oriented recess further including an inward end surface defining a load receiving surface and shear sensing transducer means carried by said beam to sense shear forces introduced into said beam by the application of forces to said beam in the load measuring direction.

14. Apparatus as set forth in claim 13 wherein the depth of said radially oriented recess is such that the load receiving surface extends to or close to the longitudinal neutral axis of the beam.

15. Apparatus as set forth in claim 13 including a plug member in said radially oriented recess and located adjacent said load receiving surface.

16. Apparatus as set forth in claim 13 wherein said beam has a generally circular cross-section, said wall means of said radially oriented recess including a generally cylindrical sidewall extending generally parallel to said load measuring direction.

17. Apparatus as set forth in claim 15 wherein said plug member is formed of a harder material than said beam.

* * * * *